(12) United States Patent
Takahashi

(10) Patent No.: US 6,196,119 B1
(45) Date of Patent: Mar. 6, 2001

(54) DEEP FAT FRYER

(75) Inventor: Akito Takahashi, Nagoya (JP)

(73) Assignee: Paloma Industries, Limited, Aichi (JP)

( * ) Notice: Subject to any disclaimer, the term of this patent is extended or adjusted under 35 U.S.C. 154(b) by 0 days.

(21) Appl. No.: 09/612,702

(22) Filed: Jul. 10, 2000

(30) Foreign Application Priority Data

Aug. 27, 1999 (JP) .................................................. 11-241344

(51) Int. Cl.[7] .............................. A47J 37/00; A47J 37/12
(52) U.S. Cl. .......................... 99/403; 99/330; 126/376.1; 126/390.1; 431/1
(58) Field of Search ............................. 99/325–334, 403, 99/408–410; 126/376.1, 390.1, 92 AC; 431/1, 326, 328

(56) References Cited

U.S. PATENT DOCUMENTS

| | | | |
|---|---|---|---|
| 4,289,111 | * | 9/1981 | Duncan et al. .................... 126/376.1 |
| 4,397,299 | | 8/1983 | Talylor et al. ........................ 126/391 |
| 4,715,807 | * | 12/1987 | Yokoyama et al. ...................... 431/1 |
| 4,808,107 | * | 2/1989 | Yokoyama et al. ................. 99/330 X |
| 4,838,244 | * | 6/1989 | Giles, Sr. et al. ................. 126/390.1 |
| 4,848,317 | * | 7/1989 | Prudhomme et al. ............. 126/376.1 |
| 4,848,318 | | 7/1989 | Brewer ................................. 126/390 |
| 4,863,370 | * | 9/1989 | Yokoyama ............................... 431/1 |
| 4,913,041 | * | 4/1990 | Taber ................................. 99/403 X |
| 4,947,824 | * | 8/1990 | Ejiri et al. ............................... 99/403 |
| 4,955,805 | * | 9/1990 | Ishiguro et al. .......................... 431/1 |
| 5,020,987 | * | 6/1991 | Ishiguro et al. .......................... 431/1 |
| 5,038,753 | * | 8/1991 | Yokoyama ............................. 99/403 |
| 5,402,713 | * | 4/1995 | King ..................................... 99/408 |
| 5,417,202 | * | 5/1995 | Cote ..................................... 99/330 |

* cited by examiner

*Primary Examiner*—Timothy F. Simone
(74) *Attorney, Agent, or Firm*—Pearson & Pearson, LLP

(57) ABSTRACT

A deep fat fryer is provided including a frypot of which the welded joints avoid the generation of flaws or cracks. The frypot (10) is a particular form of container made of metal sheets and having a top side opened and a bottom side closed, which comprise a pair of opposed connect sidewalls (11) and (12) arranged parallel to each other and a pair of opposed bending sidewalls (13) and (14) arranged of a bent shape. The bending sidewall comprises an upper sidewall portion (13a) or (14a) at the top side, a lower sidewall portion (13b) or (14b), and a sloping sidewall portion (13c) or (14c) connecting the upper and lower portions to each other, the distance between the two lower sidewall portions (13b) and (14b) being smaller than that between the two upper sidewall portions (13a) and (14a). The frypot is integrally fabricated by welding two halves along the vertical separating line (M) which extends across the connect sidewalls to the bottom side along a center line orthogonal to the horizontal. More particularly, a pair of frypot halves (30) are separately fabricated by pressing, assembled in position, and fixedly joined to each other by welding along the vertical separating line (M).

2 Claims, 7 Drawing Sheets

(a)

(b)

(a)

(b)

(a)

(b)

DEEP FAT FRYER

BACKGROUND OF THE INVENTION

1. Technical Field related to the Invention

The present invention relates to a deep fat fryer for cooking foodstuffs in cooking oil supplied and heated in a frypot.

2. Description of the Related Art

A deep fat fryer of such a conventional type comprises, as shown in FIG. 9, a frypot 1 incorporating a box-like form of container of which the top side is open and the bottom side is closed and an apron 8 mounted to the top of the frypot 1. The frypot 1 comprises a pair of opposed joint sidewalls 2 arranged parallel to each other and a pair of opposed bending sidewalls 3. The bending sidewall 3 comprises an upper sidewall portion 4 at the upper side spaced widely from its counterpart, a lower sidewall portion 5 at the lower side spaced from its counterpart by a distance smaller than that of the upper sidewall portion 4, a sloping sidewall portion 6 connecting the upper sidewall portion 4 and the lower sidewall portion 5 to each other, and an bottom sidewall portion 7 having an arcuate form in cross section bent inwardly of the lower sidewall portion 5. The frypot 1 is commonly fabricated, as shown in FIG. 10, by punching and pressing metal sheets to form the two opposed joint sidewalls 2 having a symmetrical shape for sandwiching between the two opposed bending sidewalls 3 and then assembling and welding the joint sidewalls 2 and the bending sidewalls 3 securely. The frypot 1 can be heated by the combustion on burners 9 which are provided so as to sandwich the lower sidewall portions 5 of the opposed bending sidewalls 3. In other words, the lower sidewall portions 5 are heating surfaces (heat dissipating sides).

The shape of the bending sidewall 3 is so designed that the frypot 1 is minimized in the volume of oil and increased in the heat absorbing area. The lower narrow part of the frypot 1 sandwiched between the two lower sidewall portions 5 is provided for collecting the cooking debris of foodstuffs and preventing the deterioration of the oil.

Problem that the Invention is to solve

However, the lower sidewall portions 5 of the bending sidewalls 3 which are the heating surfaces develop thermal expansion and contraction due to repeated cycles of heating and cancellation of the burner 9 and will hence receive thermal stress particularly at their joint to the joint sidewalls 2 and permit the generation of flaws or cracks.

SUMMARY OF THE INVENTION

The present invention is directed towards solving the above problem and its object is to provide a deep fat fryer equipped with a frypot hardly permitting the generation of flaws or cracks and a method of fabricating the deep fat fryer.

According to the present invention defined in claim 1, the frypot is integrally fabricated by welding the paired frypot halves to each other along the vertical separating line which extends across the connect sidewalls to the bottom side along the center line orthogonal to the horizontal. As the welded joint is spaced from the lower sidewall portions of the bending sidewalls which are directly heated by the burner means, it will be less affected by thermal expansion and contraction of the lower sidewall portions and hardly receives thermal stress.

Also, the paired frypot halves of the frypot which are fixedly joined to each other by welding along the vertical separating line are separately formed by pressing metal sheets, hence allowing the number of components and the number of joints of the frypot to significantly decrease as compared with the prior art.

According to the present invention defined in claim 2, the frypot is integrally fabricated by welding the frypot segments to each other along the horizontal separating line which extends horizontally across the connect sidewalls along the boundary between the intermediate sidewall portions and the lower sidewall portions or along the boundary between the intermediate sidewall portions and the upper sidewall portions. As the welded joint is spaced from the lower sidewall portions of the bending sidewalls which are directly heated by the burner, it will be less affected by thermal expansion and contraction of the lower sidewall portions and hardly receives thermal stress. Also, the two, upper and lower, frypot segments are separated from each other by the horizontal separating line, they can easily be fabricated by simple pressing.

MODES FOR EMBODYING THE INVENTION

Figure 1:
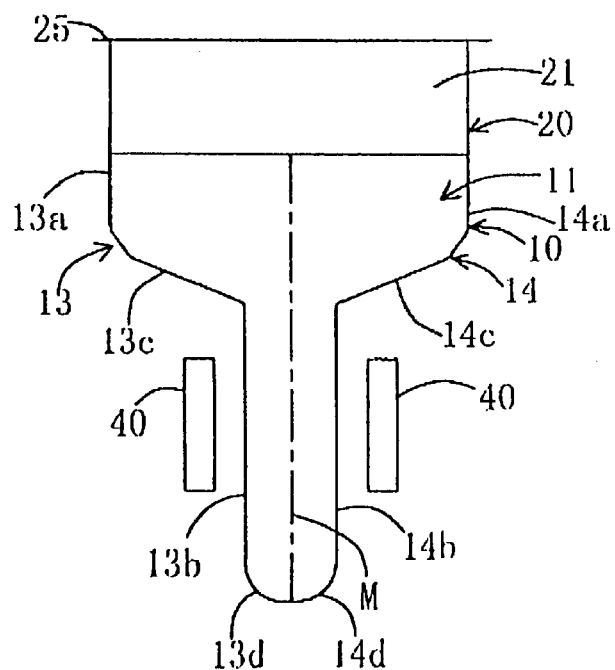
FIG. 1 is a front view showing schematically a primary part of the construction of a deep fat fryer according to one embodiment of the present invention.
Figure 2:
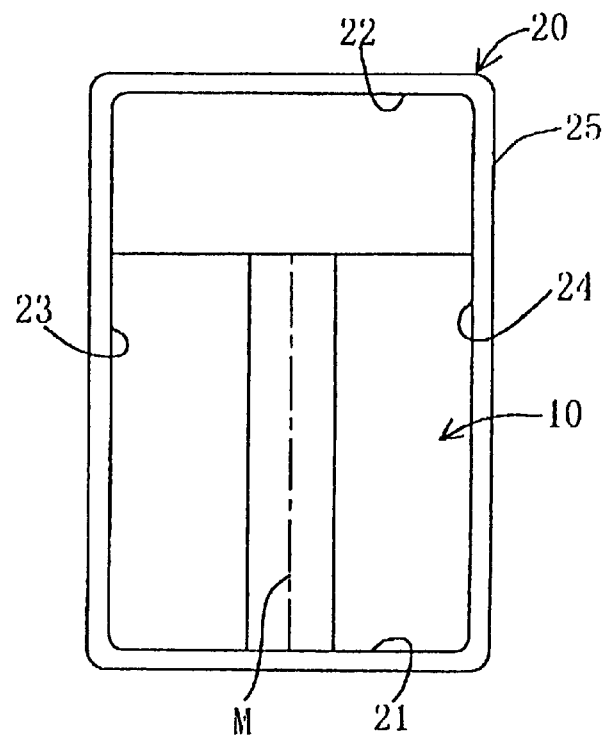
FIG. 2 is a plan view of the deep fat fryer.
Figure 3:
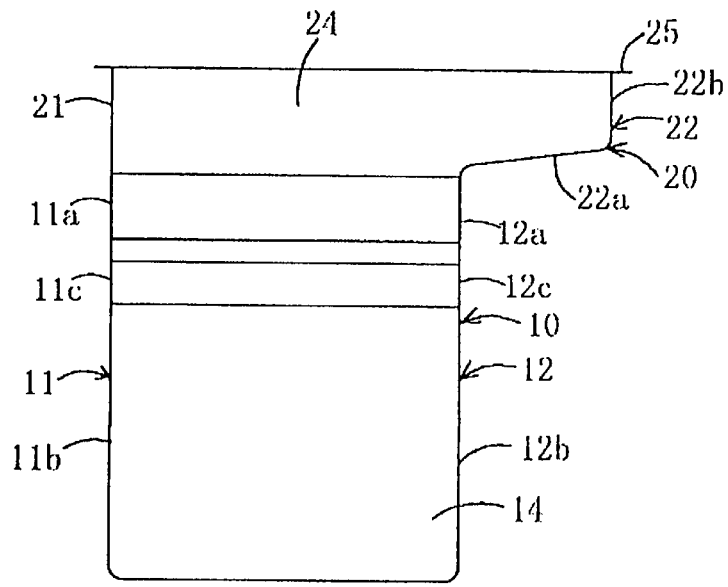
FIG. 3 is a side view of the deep fat fryer (excluding a burner)

Embodiments of the present invention will be described referring to the relevant drawings. FIGS. 1 to 3 are a front view, a plan view, and a right side view (excluding a burner) illustrating schematically a construction of a commercial deep fat fryer of the embodiment.

The deep fat fryer comprises a frypot 10, an apron 20 mounted integrally on the uppermost end of the frypot 10, and burners 40 for heating the frypot 10. The deep fat fryer is fixedly mounted to a housing not shown while the action of the burner 40 is controlled by a controller not shown.

The frypot 10 is a particularly shaped container made of metal sheets having a top side opened and a bottom side closed, which comprises a pair of opposed connect sidewalls 11 and 12 arranged parallel to each other and a pair of opposed bending sidewalls 13 and 14 arranged in symmetry at both sides. Each of the bending sidewalls 13 and 14 comprises an upper sidewall portion 13a or 14a spaced by a wider distance from its counterpart portion 14a or 13a, a lower sidewall portion 13b or 14b spaced by $\frac{1}{14}$ the wider distance from its counterpart portion 14b or 13b, and a sloping sidewall portion 13c or 14c connecting in substantially tilted relationship the upper portion 13a and the lower portion 13b or 14a and 14b to each other. The lower sidewall portion 13b or 14b is connected at the lowermost to a bottom portion 13d or 14d bent inwardly to have an arcuate shape in cross section; the two bottom portions 13d and 14d forming a bottom of the frypot. The upper sidewall portion 13a or 14a is connected by a narrow bent to the sloping sidewall portion 13c or 14c. An interface between the sloping sidewall portion 13c or 14c and the lower sidewall portion 13b or 14b has a small arcuate shape in cross section.

Each of the connect sidewalls 11 and 12 comprises a wide, upper parallel portion 11a or 12a connected between the upper sidewall portions 13a and 14a, a narrow, lower parallel portion 11b or 12b having a width of substantially ¼ that of the upper parallel portion 11a or 12a and connected between the lower sidewall portion 13b or 14b, and an intermediate parallel portion 11c or 12c having substantially an inverted trapezoid shape between the upper parallel portion 11a or 12a and the lower parallel portion 11b or 12b and connected between the two sloping sidewall portions 13a and 14c.

Figure 4:
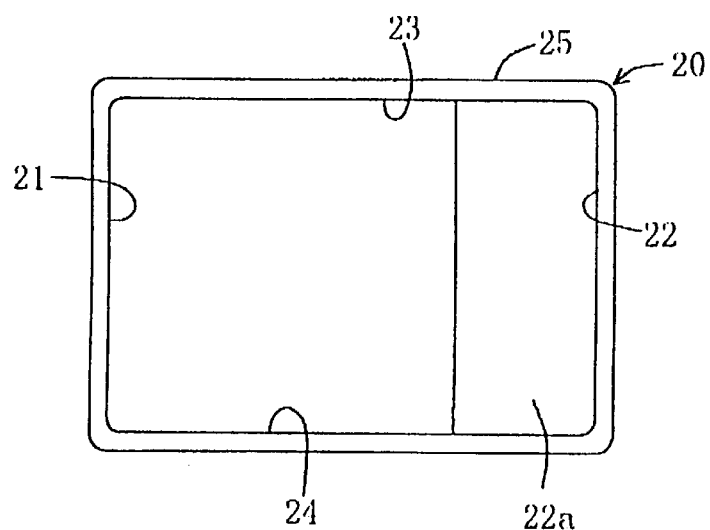
FIG. 4 illustrates a plan view and a right side view of an apron of the deep fat fryer.
Figure 4:
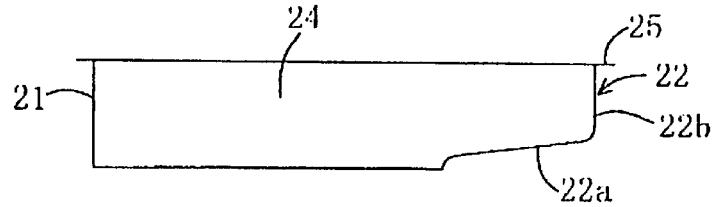

The apron 20 is a rectangular frame made of metal sheets, as shown in FIG. 4, comprising a pair of sidewalls 21 and 22 connected from the connect sidewalls 11 and 12 respectively and another pair of sidewalls 23 and 24 connected from the sloping sidewalls 13 and 14 respectively of the frypot 10. The bottom opening of the apron 20 is substantially identical in the shape to the top opening of the frypot 10. The sidewall 22 at the back includes an extension portion 22a extending in a rear outward direction (rightward in the figure) from the bottom at a tilting angle to the horizontal and a vertical portion 22b bent vertically from the extension portion 22a. The sidewalls 23 and 24 also extend outwardly to follow the extension portion 22a and the vertical portion 22b. Therefore, the top opening of the apron 20 is greater than the bottom opening as extending outwardly in the same direction. The extended top opening of the apron 20 is contemplated for ease of the input of foodstuffs during the cooking. A flange 25 extending by a small distance horizontally and radially is provided along the edge of the top opening of the apron 20. The apron 20 may be formed by hydraulic pressing of a metal tube to the shape.

A method of fabricating the deep fat fryer will now be explained.

Figure 5:
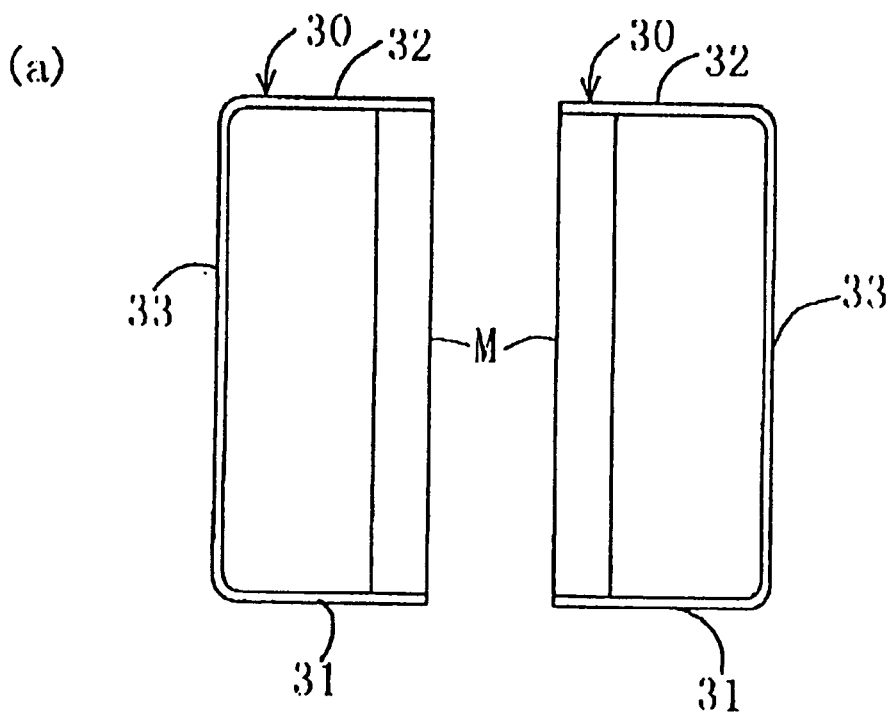
FIG. 5 illustrates a plan view and a front view of a pair of frypot halves forming a frypot of the deep fat fryer.
Figure 5:
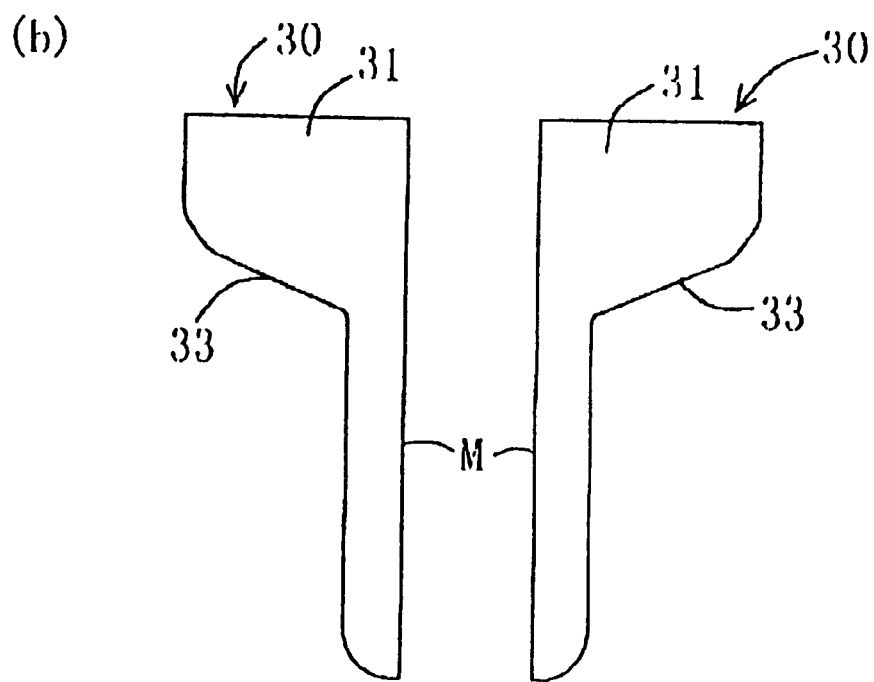
Figure 6:
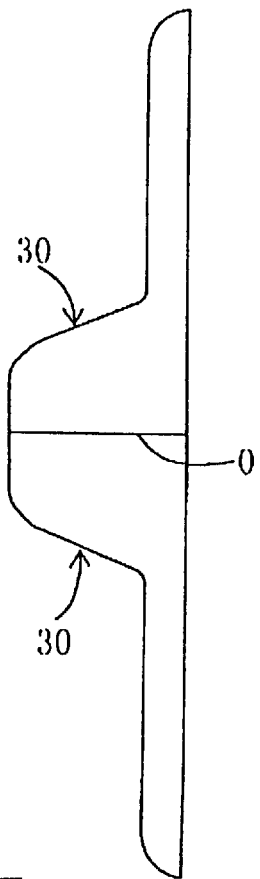
FIG. 6 is a front view showing the paired frypot halves formed at once.
Figure 7:
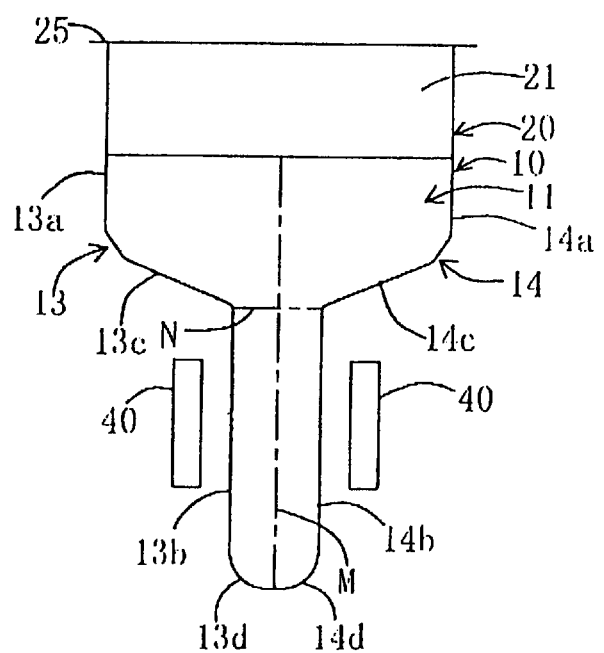
FIG. 7 is a front view showing schematically a primary part of the construction of a deep fat fryer according to another embodiment of the present invention.
Figure 8:
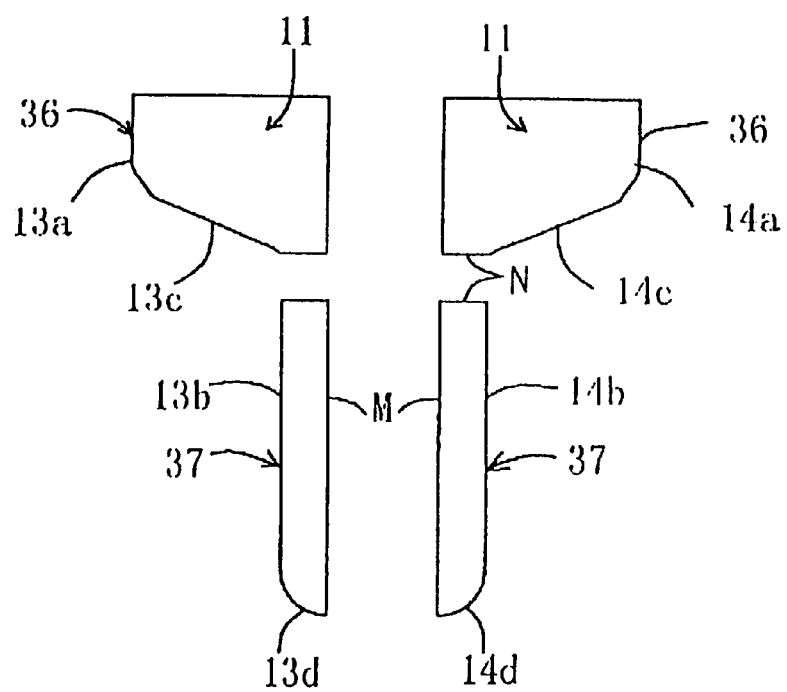
FIG. 8 is an exploded view showing schematically a frypot of the deep fat fryer of the another embodiment.
Figure 9:
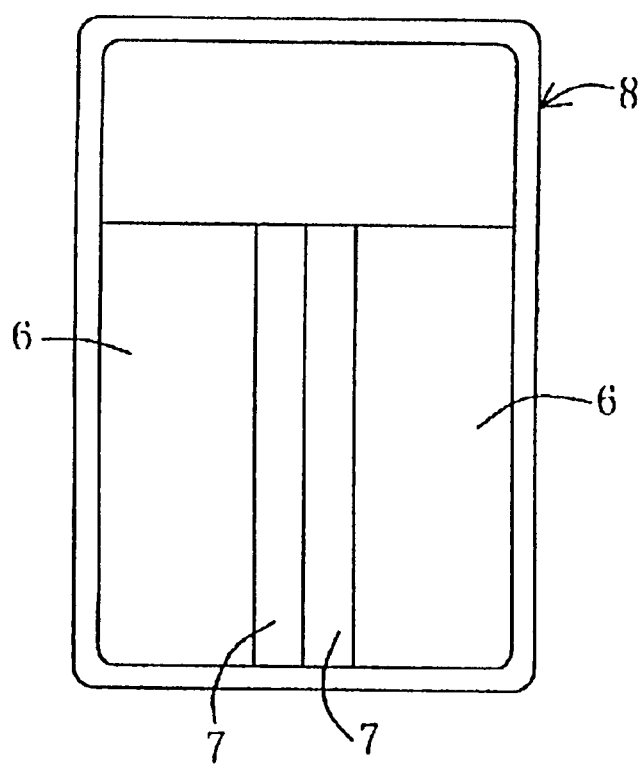
FIG. 9 illustrates a plan view and a front view of a primary part of the construction of a conventional deep fat fryer.
Figure 9:
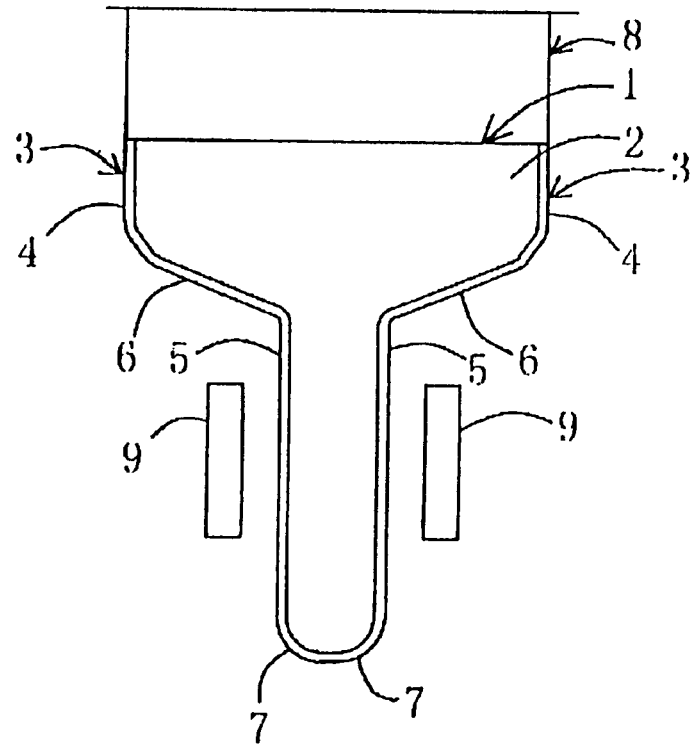
Figure 10:
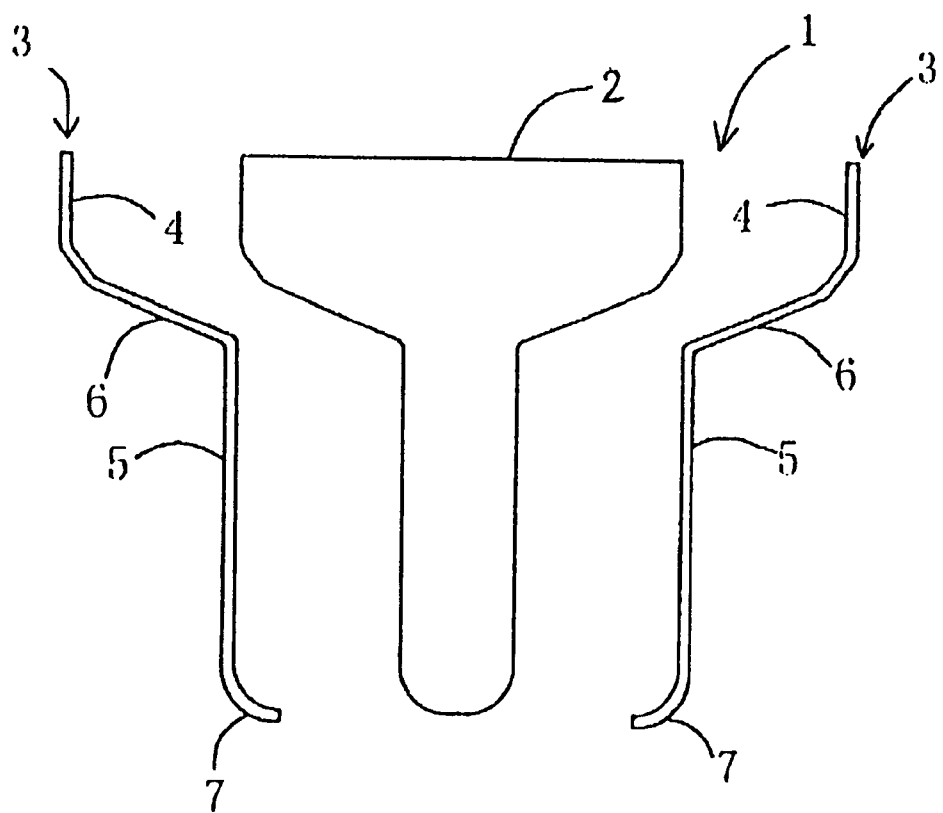
FIG. 10 is an exploded view showing schematically a frypot of the conventional deep fat fryer.

The fabrication of the frypot 10 starts with pressing identical metal sheets to have a pair of frypot halves 30 as shown in FIG. 5. The frypot half 30 comprises a pair of opposed connect sidewalls 31 and 32 arranged parallel to each other and a bending sidewall 33 bent to a shape. Each of the connect sidewalls 31 and 32 is identical to one of the two, left and right, halves of the connect sidewall 11 or 12 separated along the vertical separating line M which extends on the horizontal center line of the connect sidewalls 11 or 12; the edge thereof defined by the vertical separating line M is opposite to the bending sidewall 33. The bending sidewall 33 is identical to and represents the bending sidewall 13 or 14. The frypot half 30 may be fabricated by simply pressing a single metal sheet to its shape or preferably for increasing the efficiency, as shown in FIG. 6, by pressing a metal sheet to have a combination of the paired frypot halves 30 connected in symmetry to each other and then separating them along the center line 0 with a laser cutting device.

At the next step, the paired frypot halves 30 are positioned on both sides of the vertical separating line M and joined to each other by welding along the vertical separating line M to complete the frypot 10. The frypot 10 is then welded at the top opening with the bottom of the apron 20, constituting a main body of the fryer. The deep fat fryer main body is installed in a housing not shown. The burners 40 are then mounted so that they locate outside and opposite to substantially vertically intermediates of the lower sidewall portions 13b and 14b of the frypot 10. The deep fat fryer is completed when relevant gas conduits and electrical lines to the controller are installed.

In the deep fat fryer featured with the above construction, the vertical separating line M or the welded joint on the frypot 10 is spaced from the lower sidewall portions 13b and 14b of the bending sidewalls 13 and 14 which are directly heated by the burners 40. This allows the welded joint to be less affected by thermal stress from thermal expansion and contraction of the lower sidewall portions 13b and 14b derived from repeated cycles of heating and cancellation of the burners 40, hence effectively preventing the generation of flaws or cracks on the welded joint of the frypot 10. Also, the frypot 10 is fabricated by welding the paired frypot halves 30 to each other, hence minimizing the number of components as well as the number of joints and lowering the fabrication cost of the frypot 10.

Another embodiment of the present invention will be described.

According to the another embodiment, the frypot half of the frypot 10 of a deep fat fryer is also separated into two pieces, an upper frypot segment 36 and a lower frypot segment 37, by cutting along the horizontal separating line N which extends across the connect sidewall 11 or 12 at the boundary between the sloping sidewall portion 13c or 14c and the lower sidewall portion 13b or 14b. More particularly, the horizontal separating line N extends between the sloping sidewall portion 13c or 14c and the lower sidewall portion 13b or 14b of the bending sidewall 13 or 14. The upper frypot segment 36 and the lower frypot segment 37 are separately fabricated by hydraulic pressing, assembled together at the horizontal separating line N, and fixedly joined to each other by welding along the horizontal separating line N, hence forming the frypot half 30.

As the welded joint on the frypot 10 extends along the horizontal separating line N across the connect sidewalls 11 and 12 between the sloping sidewall portions 13c and 14c and the lower sidewall portions 13b and 14b, it is located at the top end of the lower sidewall portions 13b and 14b of the bending sidewalls 13 and 14 which are directly heated by the burners 40. The location far from the burners 40 allows the welded joint to be less affected by thermal expansion and contraction of the lower sidewall portions 13b and 14b derived from repeated cycles of heating and cancellation of the burner 40, hence effectively preventing the generation of flaws or cracks on the welded joint. Also, as the upper frypot segment 36 and the lower frypot segment 37 are fabricated separately by hydraulic pressing, the step of pressing will be made easier.

Although the horizontal separating line N in the latter embodiment extends along the boundary between the sloping sidewall portion and the lower sidewall portion of each bending sidewall, it may extend across the connect sidewalls 11 and 12 between the sloping sidewall portion 13c or 14c and the upper sidewall portion 13a or 14a of the bending sidewall 13 or 14. Such a modification will provide the same effect as of the latter embodiment.

The paired frypot halves of the embodiments are formed but not limited to in the symmetry. Also, the fryer of each of the embodiments is an example and various modifications will be possible without departing the scope of the present invention.

As defined in claim 1 of the present invention, the welded joint on the frypot is spaced from the lower portions of the bending sidewalls which are directly heated by the burner means and will thus be less affected by the thermal expansion and contraction of the lower portions derived from the burner means heating and hardly suffer from thermal stress. Accordingly, the generation of flaws or cracks on the welded joint will significantly be avoided. Also, the frypot is minimized in the number of components and the number of joints and its production cost will hence be reduced.

The welded joint on the frypot extends along the boundary between the sloping sidewall portions and the lower sidewall portions of the bending sidewalls or between the sloping sidewall portions and the upper sidewall portions of the bending sidewalls so as to be spaced from the lower sidewall portions of the bending sidewalls which are directly heated by the burner means, hardly suffering from thermal stress and thus being prevented from the generation of flaws or cracks. Also, the frypot half consists mainly of two, upper and lower, segments which can thus be fabricated by press forming easily (as defined in claim 2 of the present invention).

I claim:

1. A deep fat fryer comprising:

a frypot incorporating a box-like container of which the top side is open and the bottom side is closed and which consists mainly of a pair of opposed bending sidewalls, each of the bending sidewalls including an upper sidewall portion at the top side spaced from its counterpart, a lower sidewall portion at the bottom side spaced from its counterpart by a distance smaller than that of the upper sidewall portion, and an intermediate sidewall portion connecting the upper sidewall portion and the lower sidewall portion to each other, and another pair of opposed connect sidewalls, each of the connect sidewalls connected at both side rims of the paired bending sidewalls; and burner means mounted at the outer sides of the lower sidewall portions to be opposite to the lower sidewall portions for heating cooking oil in the frypot, said frypot comprising a pair of frypot halves separated from each other by a vertical separating line which extends vertically across the paired connect sidewalls to the bottom side along substantially a center line orthogonal to the horizontal, the paired frypot halves being fixedly joined to each other by welding along the vertical separating line.

2. A deep fat fryer according to claim 1, wherein the frypot half comprises an upper frypot segment and a lower frypot segment, both separated from each other by a horizontal separating line which extends horizontally across the connect sidewalls along the boundary between the intermediate sidewall portions and the lower sidewall portions or along the boundary between the intermediate sidewall portions and the upper sidewall portions, the two, upper and lower, frypot segments being fixedly joined to each other by welding along the horizontal separating line.

* * * * *